United States Patent Office 2,911,584
Patented Nov. 3, 1959

2,911,584

COMPOUNDED SYNCHRONOUS DYNAMO-ELECTRIC MACHINES

Oscar Ebbe Käll, Ljungby, Sweden, assignor to Kellma Aktiebolag, Ljungby, Sweden, a corporation of Sweden Application October 25, 1957, Serial No. 692,345

Claims priority, application Sweden February 2, 1957

1 Claim. (Cl. 322—17)

This invention refers to improvements in compounded synchronous dynamo-electric machines of the kind disclosed and claimed in my United States Patent application Serial No. 570,463, filed on March 9, 1956, and more particularly to the type thereof in which the inductances of the exciter are composed of armature and compound windings and the latter, together with the commutator whose segments are connected to the armature winding, are stationary but the brush gear is rotatable and coupled to the machine shaft.

The object of the invention is to provide a compounded synchronous machine in which the exciter, for a predetermined power rating and a predetermined number of poles ($p=4$ or more, corresponding to a number of revolutions of 1,500 per minute or more) of the machine, can be made of smaller dimensions than in the case of synchronous machines having a conventional exciter or an exciter according to my said earlier application.

More particularly, it is an object of the invention to provide an exciter having a constant size for a certain power rating of the synchronous machine, independently of the number of revolutions, rather than, as is otherwise necessary, having a greater axial length and possibly a greater diameter at a lower number of revolutions (greater number of poles).

Furthermore, it is an object of the invention to provide synchronous machine assemblies for low numbers of revolutions, having reduced dimensions particularly in an axial direction.

Another object of the invention is to provide improvements in synchronous machine assemblies which will make it possible to reduce the number of exciter types required to supply synchronous generators of all ratings occurring in practice.

According to the invention, the synchronous machine is characterized by the fact that the exciter thereof is of bi-polar construction independently of the number of poles $p$ on the rotor of the synchronous machine, that the commutator has a number of segments equal to $p/2$ times the number of armature winding coils on the exciter and subdivided into $p/2$ groups, each of the segments in each group being connected with a corresponding segment in each of the remaining groups and with the terminals of the armature winding coils, whereby there may be derived across the brush gear, rotating with the number of revolutions of the synchronous machine, a direct current voltage resulting from a field which rotates at a number of revolutions $p/2$ times as large as that of the synchronous machine.

Figure 1:
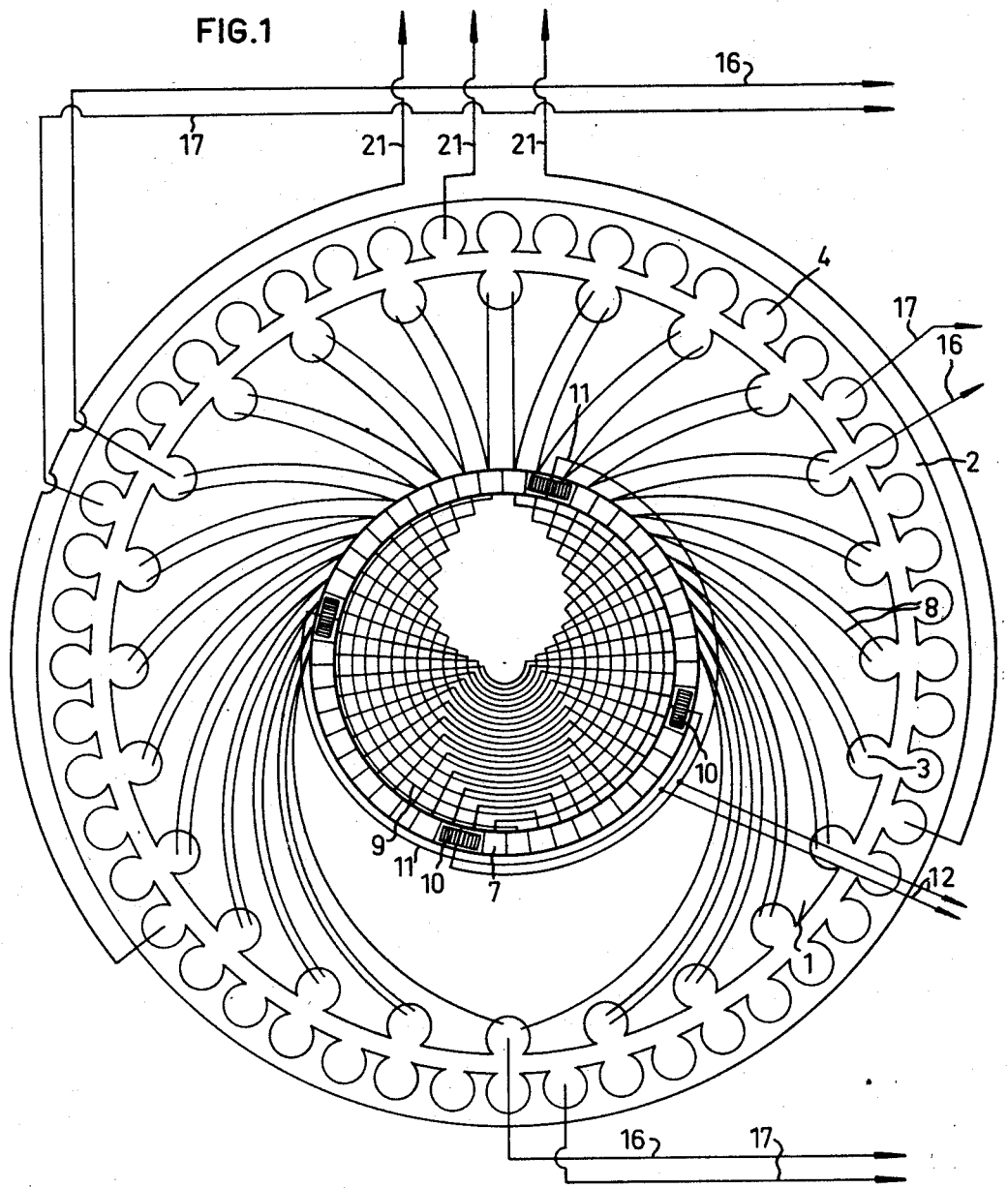

The invention will be described in detail with reference to the accompanying drawing, in which Fig. 1 diagrammatically illustrates, in end elevation, the main features of an exciter intended for a four-polar synchrous generator, Fig. 2 similarly diagrammatically illustrates the main features of an exciter intended for a six-polar synchronous generator.

Figure 2:
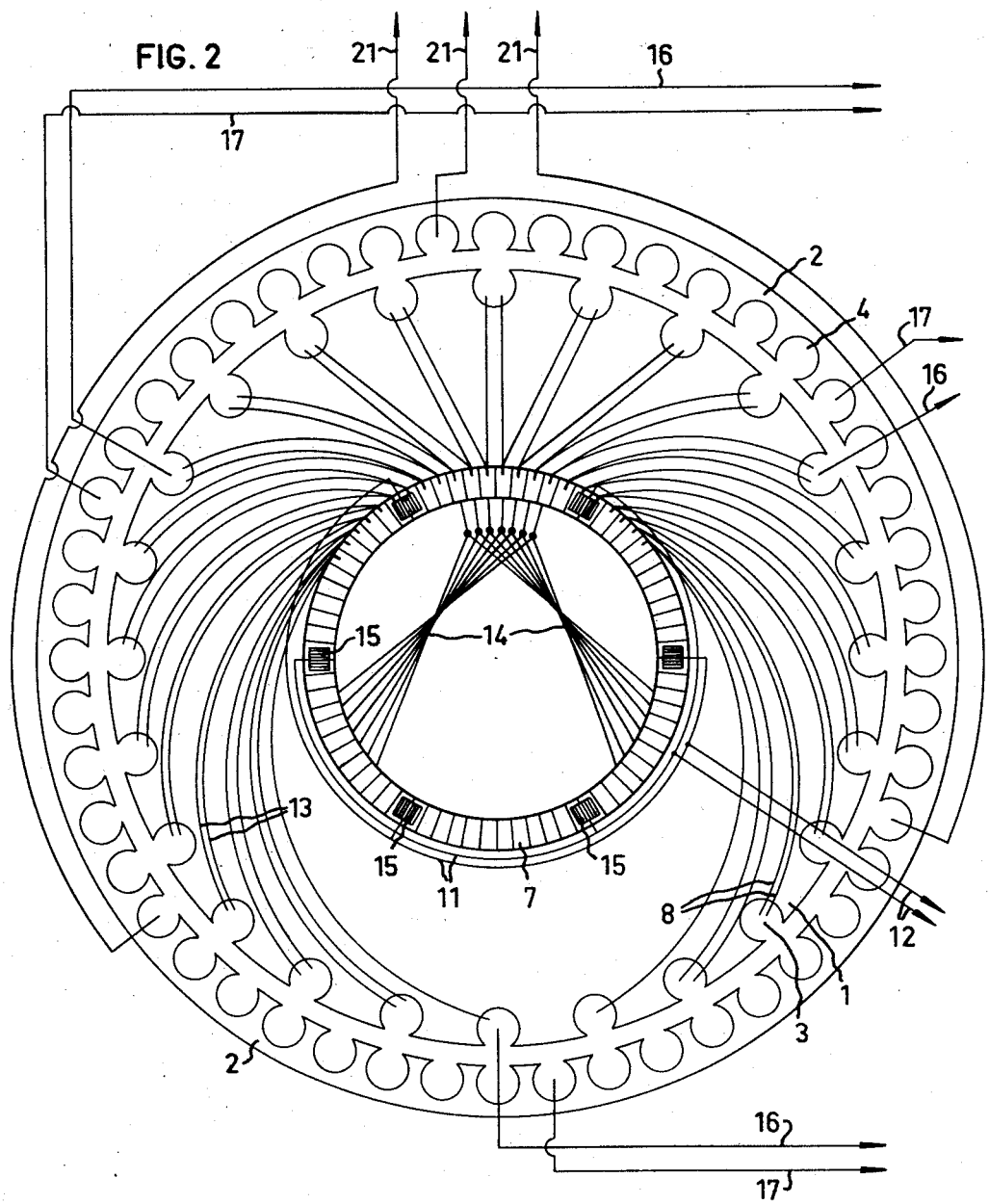
Figure 3:
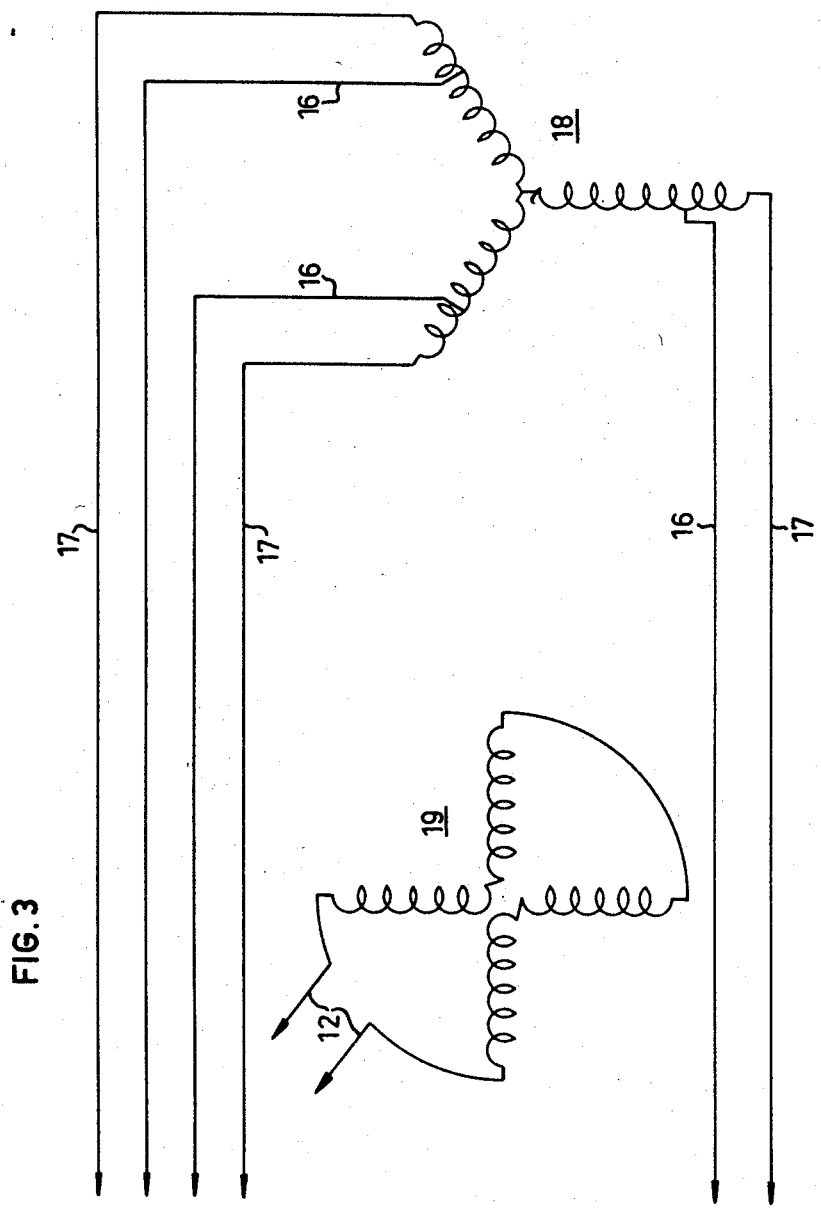
Figure 4:
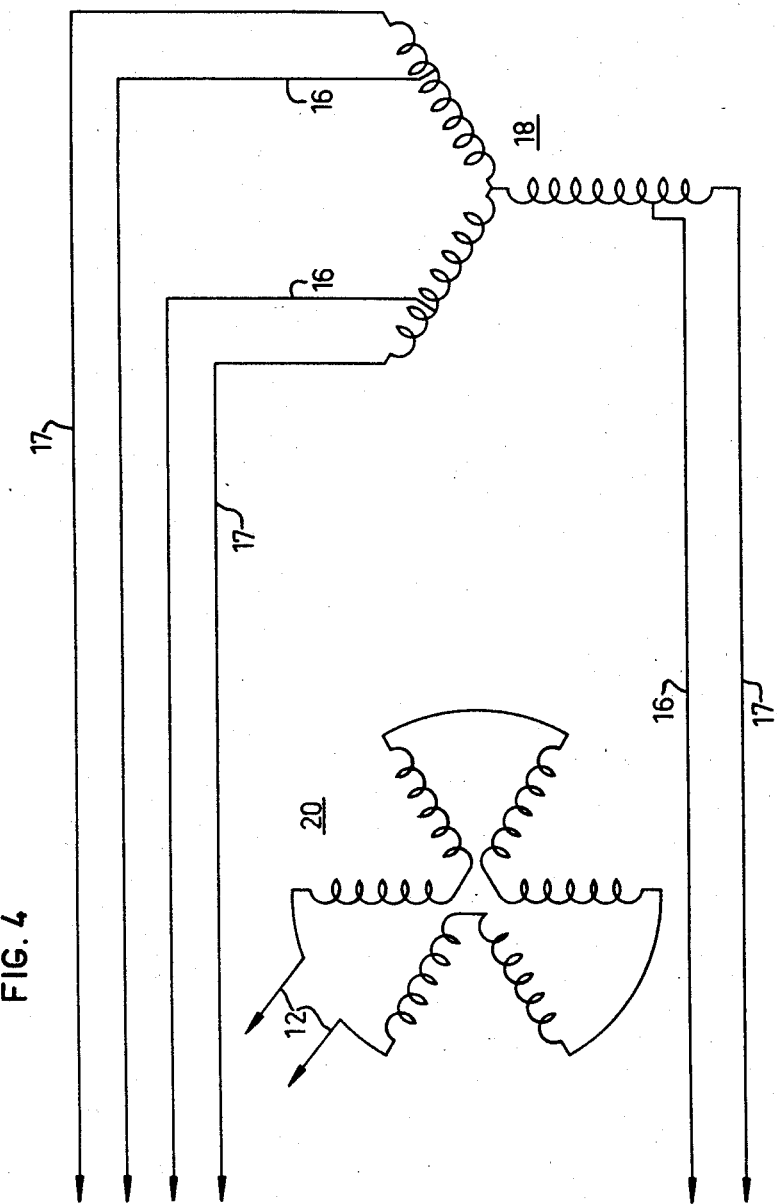

Fig. 3 is a diagram of a four-polar synchronous generator to which the exciter of Fig. 1 is connected, and Fig. 4 is a diagram of a six-polar synchronous generator to which the exciter of Fig. 2 is connected.

In Fig. 1 as well as in Fig. 2 in the drawing, 1 and 2 designate two concentric stator core portions, having slots 3 and 4, respectively, for receiving the armature winding and the compound winding, respectively, of the exciter (in Fig. 1 of said earlier application designated by 5 and 6, respectively). Said last mentioned windings are not illustrated, but the connections of the armature winding with the segments of the stationary commutator 7 are shown at 8. Connections of the armature winding with taps on the armature winding 18 of the associated four-polar synchronous generator (Fig. 3 or 4, respectively) are shown at 16 and connections of the compound winding with the terminals of the synchronous generator armature winding 18 are shown at 17. Also, the connections of the compound winding with the load are shown at 21.

In the case of the exciter of Fig. 1 it has been assumed that there are 24 slots 3 for the armature winding and that the commutator 7 has 48 segments. The segments of the commutator 7 are subdivided into two groups, each comprising one half of the commutator circumference, diametrically opposite segments being interconnected, which is shown by the connecting leads or conductors 9. Thus, by means of the connections 8 and 9 all the armature winding coils are similarly connected to the segments of both groups. The brush gear, which is mounted on the shaft of the machine assembly and thus rotates with the same number of revolutions as the synchronous machine, is diagrammatically illustrated by four equally angularly spaced brushes 10 which are alternately interconnected, as shown by conductors 11, and connected through conductors 12 with the excitation winding 19 of the synchronous machine as shown in Fig. 3. It is essential to note that while there are four brushes, they will operate as two only due to the fact that each pair of interconnected brushes will always contact two diametrically opposite segments which are connected through conductors 9. Thus, the exciter is bi-polar and might operate with two brushes only, although it is advantageous to increase the active brush area by utilizing the possibility of using four brushes.

In the same manner as described in my copending application, a rotating field will be created in the exciter through the action of the armature current of the synchronous machine in passing through the armature and compound windings of the exciter. The number of revolutions of this field will be dependent on the number of poles of the synchronous machine. In the case of a four-polar synchronous machine, with an exciter such as that described in my earlier copending application, the number of revolutions of the field will be equal to the number of revolutions of the synchronous machine, but when using the exciter as described above in conjunction with a four-polar synchronous machine, the number of revolutions of the field will be twice as high. Thus, the result is that a bi-polar exciter can be used for a four-polar synchronous machine, and since such an exciter may be made smaller, above all shorter, than a four-polar exciter for the same power output and with a predetermined flux density in the iron, the object of the invention of being able to reduce the overall dimension of the machine assembly as a whole, particularly in the lengthwise direction, is achieved.

The exciter of Fig. 2, which is intended for a six-polar synchronous generator, differs from that already described by the segments of the commutator 7 being subdivided into three groups, each comprising one third of the circumference, segments situated in corresponding positions, i.e. displaced 120° from each other, in the three groups being connected with the same armature winding coils and with each other through conductors 13 and 14, respectively. As the armature winding on this exciter also is provided in 24 slots, there will accordingly be required 72 segments on the commutator. The exciter is provided with a brush gear comprising six brushes 15 which are alternately interconnected in two groups, including three brushes each, through conductors 11, each group being connected with the conductors 12 to the excitation winding 20 of the synchronous machine (Fig. 4). Hence, in this case also the exciter is bi-polar, those three brushes in each group which are mutually angularly spaced 120° apart always engaging three segments which are connected with each other, and thus functioning as a single brush.

During operation of the assembly which consists of the six-polar synchronous generator and the exciter as now described, a field is created in the exciter rotating at a number of revolutions three times as high as that of the machine shaft which the brush gear.

The ratio of the size of this bi-polar exciter for a six-polar generator to the size of a six-polar exciter for the same generator is generally the same as the ratio of the number of poles, i.e. 1/3. Generally, if the number of poles of the synchronous generator is $p$, the commutator then having $p/2$ times as many segments as the number of armature winding coils on the exciter and these segments being subdivided into $p/2$ groups, the size of the exciter will be $2/p$ times the size which the exciter would have if constructed for $p$ poles, at a certain predetermined generator power output.

What I claim and desire to secure by Letters Patent is:

In a compounded synchronous dynamo-electric machine including a stator, an armature winding on said stator, a rotor within said stator and an excitation winding on said rotor, said rotor having a number of poles $p$ not less than four, the provision of bi-polar exciter means for converting alternating current derived from said armature winding into direct current and supplying said direct current to said excitation winding, said exciter means comprising a stationary exciter compound winding having fixed electrical connections with said armature winding, a stationary exciter armature winding inductively coupled wtih said compound winding and composed of a number of coils, a stationary commutator having a number of segments equal to $p/2$ times the number of armature winding coils on the exciter, said segments being subdivided into $p/2$ groups and each of the segments in each group being connected with a corresponding segment in each of the remaining groups and with two adjacent armature winding coils, and rotatable brush means cooperating with said commutator and mechanically coupled with said rotor and having electrical connections fixed to the excitation winding on said rotor.

References Cited in the file of this patent
UNITED STATES PATENTS 1,385,895      Stone et al. _____ July 26, 1921